US008235569B2

(12) United States Patent
Chambers et al.

(10) Patent No.: US 8,235,569 B2
(45) Date of Patent: Aug. 7, 2012

(54) LIGHT ASSEMBLY FOR A VEHICLE

(75) Inventors: Joe Allen Chambers, Cookeville, TN (US); Nadeshda Alexsandrovina Zelikovskaya, Northville, MI (US); Felipe De Jesus Domingo Mehado Moya, West Bloomfield, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 12/872,951

(22) Filed: Aug. 31, 2010

(65) Prior Publication Data

US 2011/0069505 A1  Mar. 24, 2011

Related U.S. Application Data

(60) Provisional application No. 61/238,498, filed on Aug. 31, 2009.

(51) Int. Cl.
*B60Q 1/04* (2006.01)

(52) U.S. Cl. ......... 362/516; 362/487; 362/497; 362/499

(58) Field of Classification Search .................. 362/487, 362/499, 497, 545, 800, 240, 650
See application file for complete search history.

(56) References Cited

U.S. PATENT DOCUMENTS

| 5,539,623 | A  | * | 7/1996  | Gurz et al. ................. 362/20 |
| 5,726,535 | A  | * | 3/1998  | Yan ......................... 315/185 R |
| 5,856,779 | A  |   | 1/1999  | Friday |
| 6,149,288 | A  |   | 11/2000 | Huang |
| 6,441,943 | B1 |   | 8/2002  | Roberts et al. |
| 6,533,445 | B1 |   | 3/2003  | Rogers |
| 6,682,211 | B2 | * | 1/2004  | English et al. ............... 362/545 |
| 6,814,477 | B2 |   | 11/2004 | Yamaguchi et al. |
| 7,128,452 | B2 |   | 10/2006 | Tsai |
| 7,160,007 | B2 |   | 1/2007  | Pan |
| 7,160,008 | B2 |   | 1/2007  | Pan |
| 7,163,322 | B2 |   | 1/2007  | Tatewaki et al. |
| 7,241,019 | B1 |   | 7/2007  | Tsai et al. |
| 7,342,707 | B2 |   | 3/2008  | Roberts et al. |
| 7,396,142 | B2 | * | 7/2008  | Laizure et al. ............... 362/240 |
| 7,500,770 | B2 |   | 3/2009  | Medina |
| 7,527,297 | B2 |   | 5/2009  | Miyamoto |
| 2005/0254251 | A1 |   | 11/2005 | Chou |
| 2006/0028830 | A1 |   | 2/2006  | Tsai |
| 2006/0285348 | A1 |   | 12/2006 | Valcamp |
| 2008/0285292 | A1 |   | 11/2008 | Medina |
| 2009/0066208 | A1 |   | 3/2009  | Ng |

* cited by examiner

*Primary Examiner* — Anabel Ton
(74) *Attorney, Agent, or Firm* — Robert L. Stearns; Dickinson Wright, PLLC

(57) ABSTRACT

The invention provides a light assembly to enable various light functions, such as braking lights, tail lights, license plate lights, flashers, etc., using LEDs that consume low power and have a long service life. The LEDs are located on a single, two-sided printed circuit board (PCB), which reduces the assembly costs and the size of tail light, as well as the complexity of assembly.

11 Claims, 9 Drawing Sheets

US 8,235,569 B2

LIGHT ASSEMBLY FOR A VEHICLE

CLAIM FOR PRIORITY

This invention claims priority to U.S. Provisional Application No. 61/238,498, filed Aug. 31, 2009, the contents of which are hereby incorporated by reference.

BACKGROUND OF THE INVENTION

1. Technical Field

This invention relates generally to a light assembly for a vehicle, and in particular to a light assembly with a single printed circuit board having lights on both sides to provide various functions.

2. Related Art

In vehicles such as automobiles, boats, motorcycles, etc., incandescent light bulbs have been commonly used for indicator lamps, warning lamps and the like. More recently, light emitting diodes (LEDs) have been used as a source of illumination since they provide longer life, reduced size and are more energy efficient.

U.S. Pat. No. 6,533,445 discloses a unitary multiple light assembly for motor vehicle trailers that uses a different array of LEDs to illuminate a side marker light, a rear tail or brake light, and a license plate light, as illustrated in FIG. 1. A license plate attaching bracket holds the license plate in a location in which individual LEDs in a light fixture can shine directly on predetermined locations on the license plate. The LEDs are electrically connected in a conventional manner to a circuit board, which is distinct from the circuit boards which electrically connect the LEDs used to illuminate other features such as a side marker or brake light (not illustrated).

U.S. Application Number 2006/0028830 discloses an automobile waterproof tail light. The tail light includes a main light set, a license plate set, a side light set and a car width indicating light set arranged in a bottom base and separated with caps from one another to clearly show which light is being used, as illustrated in FIG. 2. A main light set and a license plate light set include a multiple LED lamps and are connected on the same side of an electric circuit board (not illustrated).

U.S. Publication No. 20009/0066208 discloses a printed circuit board (PCB) for mounting electrical components such as LEDs. As illustrated in FIG. 2A, an LED pair $D_{11}^+$, $D_{11}^-$ and $D_{21}^+$, $D_{21}^-$ may be mounted on a single base 300. The LED pair may be used for example in tail lights of a vehicle. However, the LED pair only provides a lamp for a single use or function.

SUMMARY OF THE INVENTION AND ADVANTAGES

The invention provides a light assembly for a motor vehicle for indicating various light functions, such as braking light, tail light, license plate light, flasher, etc., using LEDs that consume low power and have a long service life. In addition, the LEDs in a preferred embodiment are located on a single, two-sided printed circuit board (PCB), whereby the LEDs may afford different lighting functions. Additionally, the single, two-sided PCB reduces the assembly costs and the size of the light assembly, as well as the complexity of assembling the light assembly.

In one embodiment of the invention, there is a light assembly for a vehicle, including a printed circuit board configured to illuminate at least one light on a first and second side of the printed circuit board, which at least one light enables the light assembly to provide multiple lighting functions.

In one aspect of the invention, the light assembly includes a housing to reflect light from the at least one light on the first side of the printed circuit board; a lens covering the housing to diffuse and direct light outwardly; a reflector receptor located beneath the lens; and a reflector secured to the reflector receptor to reflect light.

In another aspect of the invention, at least one light on the second side of the printed circuit board illuminates a license plate of the vehicle.

In still another aspect of the invention, the single printed circuit board includes a first, a second and a third light on a first side, and a fourth light on a second side.

In yet another aspect of the invention, the first, second and third lights are configured to direct light onto the housing and reflect outwardly, and the fourth light is configured to direct light directly onto the license plate of the vehicle.

In another aspect of the invention, the lights are LEDs.

In still another aspect of the invention, the LEDs illuminate a red or white color.

In yet another aspect of the invention, the printed circuit board further includes a plurality of LEDs as the at least one light which are electrically connected in series and driven by a power source on a first side of the printed circuit board, and a single LED as the at least one light electrically connected to a second side of the printed circuit board.

In another aspect of the invention, the plurality of LEDs operate to function as a stop and tail light, and the single LED operates to functions as a license plate light.

In still another aspect of the invention, the multiple functions enable the light assembly to operate as at least one of: a tail light, a stop light, a signal light, a flasher, a license plate light, an aviation light, a boat light and a navigation light.

In another embodiment of the invention, there is a printed circuit board for use in a light assembly of a vehicle, including a first side having at least one light to operate as a first function; and a second side having at least one light to operate as a second function.

In one aspect of the invention, the printed circuit board further includes a plurality of LEDs as the at least one light on the first side which are electrically connected in series and driven by a power source, and a single LED as the at least one light on the second side electrically connected to the power source.

In another aspect of the invention, the plurality of LEDs operate to function as a stop and tail light, and the single LED operates to function as a license plate light.

In still another aspect of the invention, the printed circuit board is mounted inside of the light assembly, and the light assembly includes a housing to reflect light from the at least one light on the first side of the printed circuit board, a lens covering the housing to diffuse and direct light outwardly, a reflector receptor located beneath the lens, and a reflector secured to the reflector receptor to reflect light.

In yet another aspect of the invention, the at least one light on the first side of the printed circuit board operates to function as a stop and tail light, and the at least one light on the second side of the printed circuit board operates to functions as a license plate light.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

The invention provides a light assembly to enable various light functions, such as braking lights, tail lights, license plate lights, flashers, etc., using LEDs that consume low power and have a long service life. In addition, the LEDs are located on a single, two-sided printed circuit board (PCB), which reduces the assembly costs and the size of tail light, as well as the complexity of assembly.

Figure 1:
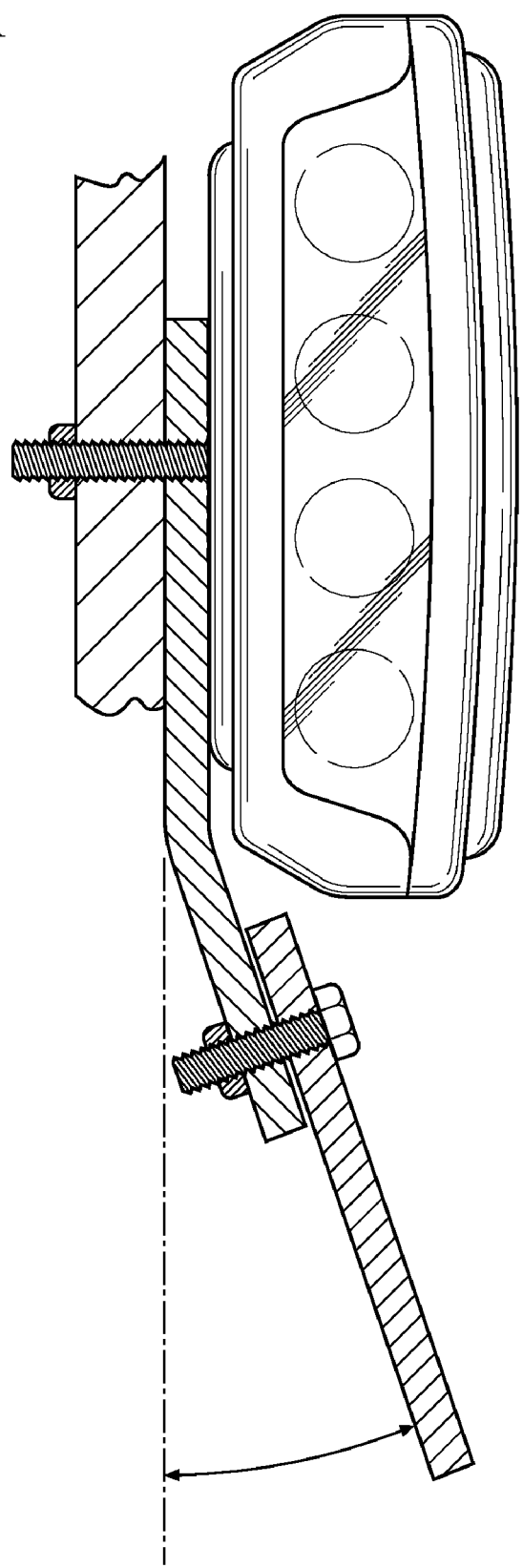
FIG. 1 illustrates a schematic exploded perspective view of an embodiment of a light for illuminating a license plate according to the prior art.
Figure 2:
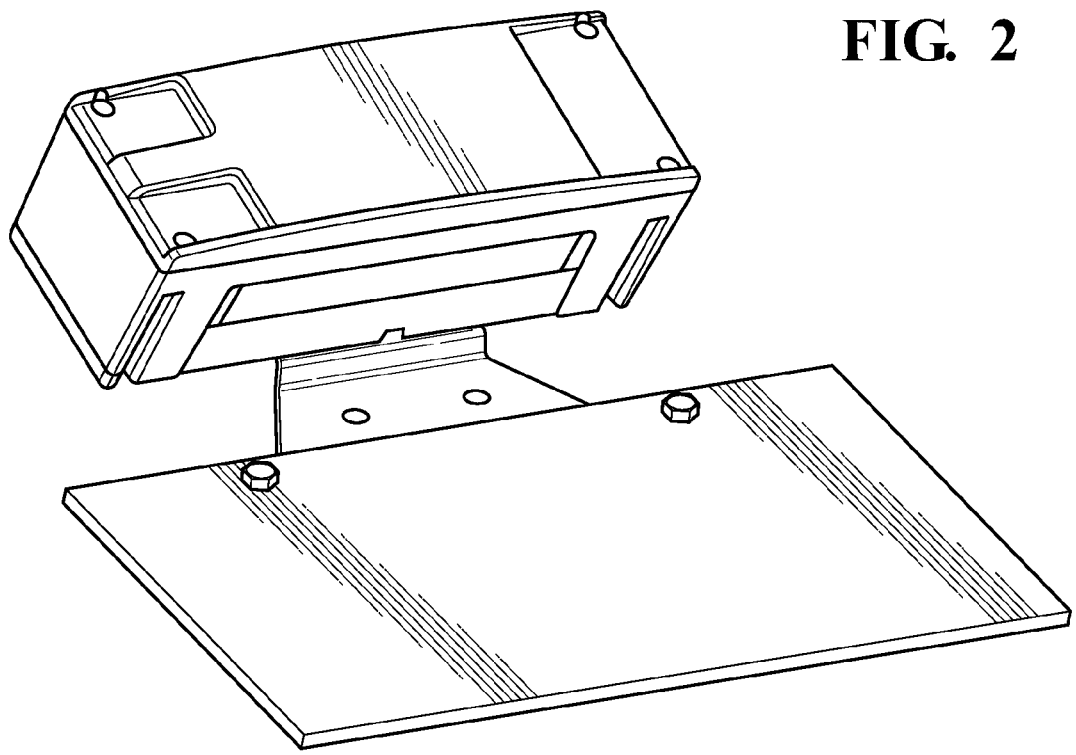
FIG. 2 illustrates an exploded perspective view of an automobile tail light according to the prior art.
Figure 2A:
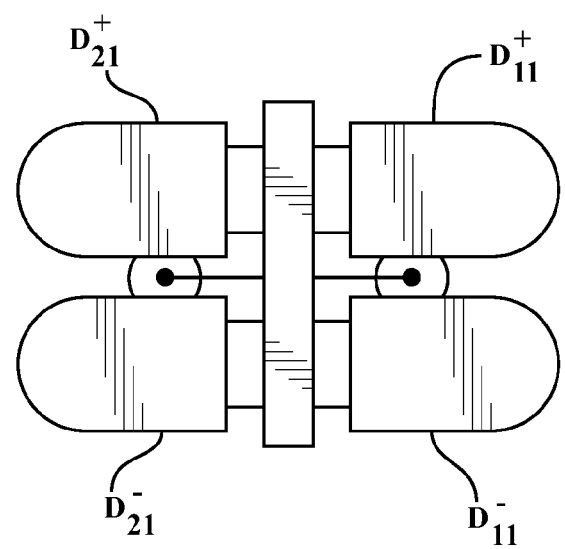
FIG. 2A illustrates a single printed circuit board with lamps on each side according to the prior art.
Figure 3A:
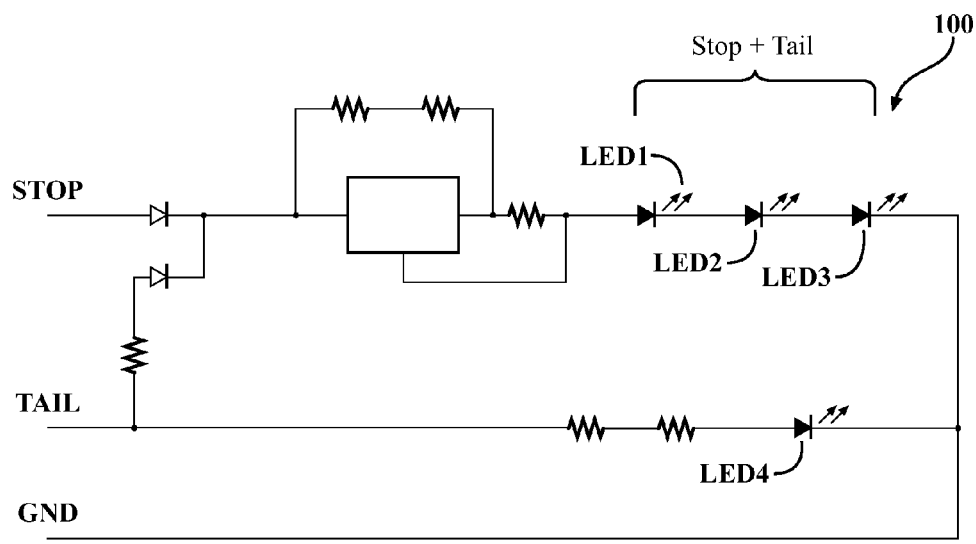
FIG. 3A illustrates an exemplary circuit diagram of the light assembly according to the invention.
Figure 3B:
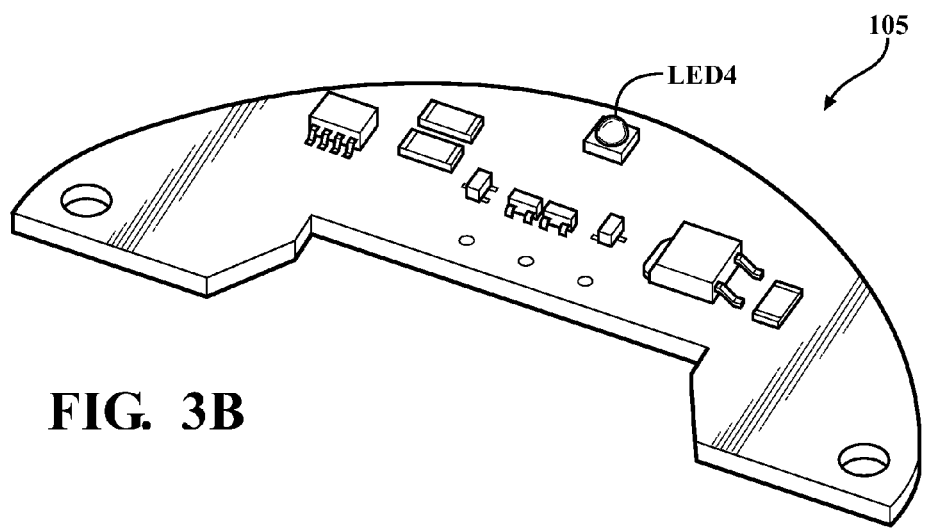
FIG. 3B illustrates an exemplary printed circuit board of the light assembly according to the invention.

FIGS. 3A-3E illustrate various embodiments of a printed circuit board in accordance with the invention. More specifically, FIG. 3A illustrates an exemplary circuit diagram of the PCB in the light assembly according to the invention. The circuit 100 in this embodiment, among other features, includes four lights (such as LEDs), namely LED1, LED2, LED3 and LED4. LED1, LED2 and LED3 are located on the front side of the PCB, while LED4 is located on the rear side of the PCB. In the illustrated embodiment, LED1, LED2 and LED3 represent a stop and tail light in the light assembly, whereas LED4 represents the license plate light in the light assembly. The circuit board operates as readily understood by the skilled artisan. FIG. 3B illustrates an exemplary embodiment of the assembled PCB 105 in accordance with the circuit 100 of FIG. 3A.

Figure 3C:
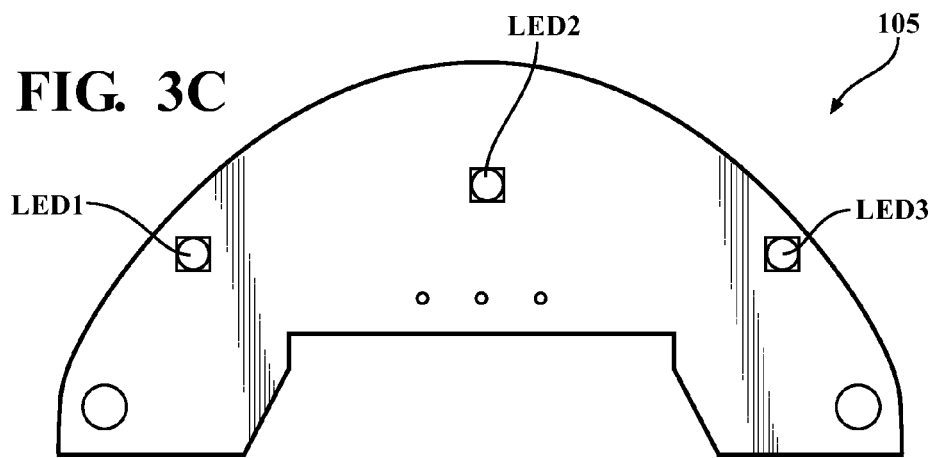
FIG. 3C illustrates an exemplary front side of the printed circuit board according to the invention.
Figure 3D:
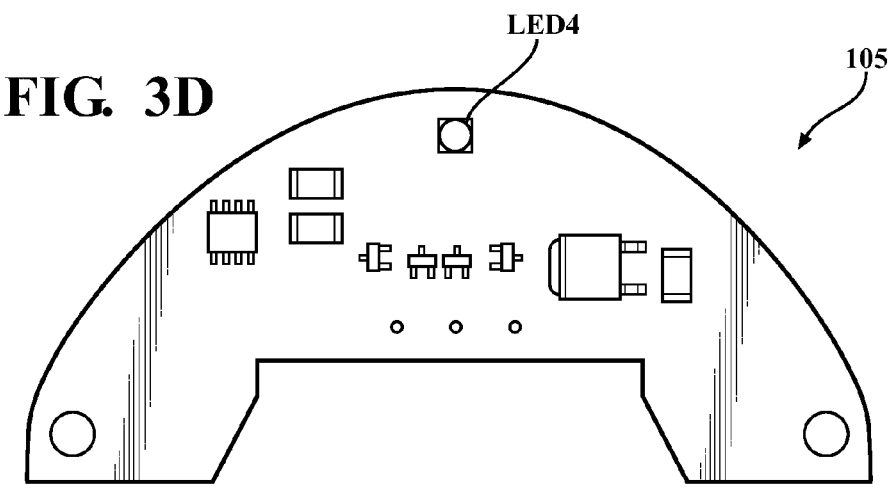
FIG. 3D illustrates an exemplary rear side of the printed circuit board according to the invention.
Figure 3E:
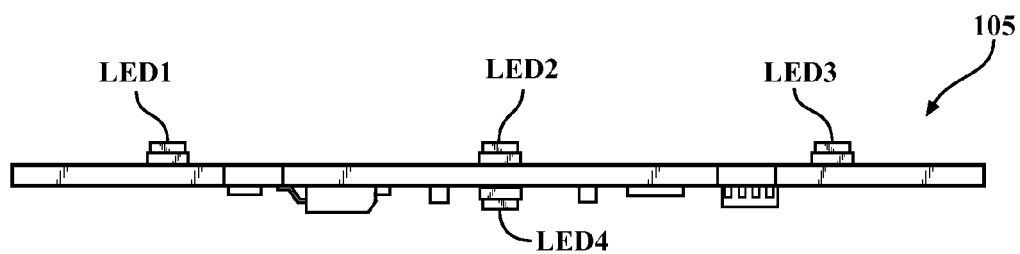
FIG. 3E illustrates an exemplary bottom view of the printed circuit board according to the invention.

FIG. 3C illustrates an exemplary front side of the printed circuit board according to the invention. As explained above, three LEDs (LED1, LED2, LED3) are electrically connected to the PCB 105. In the embodiment depicted, the LED1, LED2 and LED3 are evenly distributed on the PCB 105 for optimum lighting of the stop and tail light functions provided by the light assembly. The LEDs are preferably red in this embodiment in order to best represent the stop and tail light features. FIG. 3D illustrates an exemplary rear side of the printed circuit board according to the invention. The rear side of the PCB 105 includes various components, such as resistors, and LED4. LED4 is preferably a white LED that functions to illuminate a license plate on a motor vehicle to which the light assembly is attached. It is understood that any color LED may be used for any one of the LEDs, and each of the LEDs may be in a different color to provide various functions and features. It is also understood that the LEDs may be placed at any location on the PCB 105 (on both the front and rear sides) to provide various effects and features as required by a particular application. Additionally, the number of LEDs is not limited to those shown in the Figures, and may include any number of LEDs (either more or less than illustrated). FIG. 3E illustrates an exemplary bottom view of the printed circuit board in FIGS. 3C and 3D according to the invention. As illustrated, the LEDs 1, 2, 3 and 4 are clearly located on both the front (top) and rear (bottom) side of PCB 105. Significantly, use of a single, two-sided PCB reduces size, cost and complexity of assembly. Naturally, since a single PCB is used, there is no need for a second printed circuit board to operate a secondary, tertiary, etc. light, for example to light a license plate or other feature.

Figure 4A:
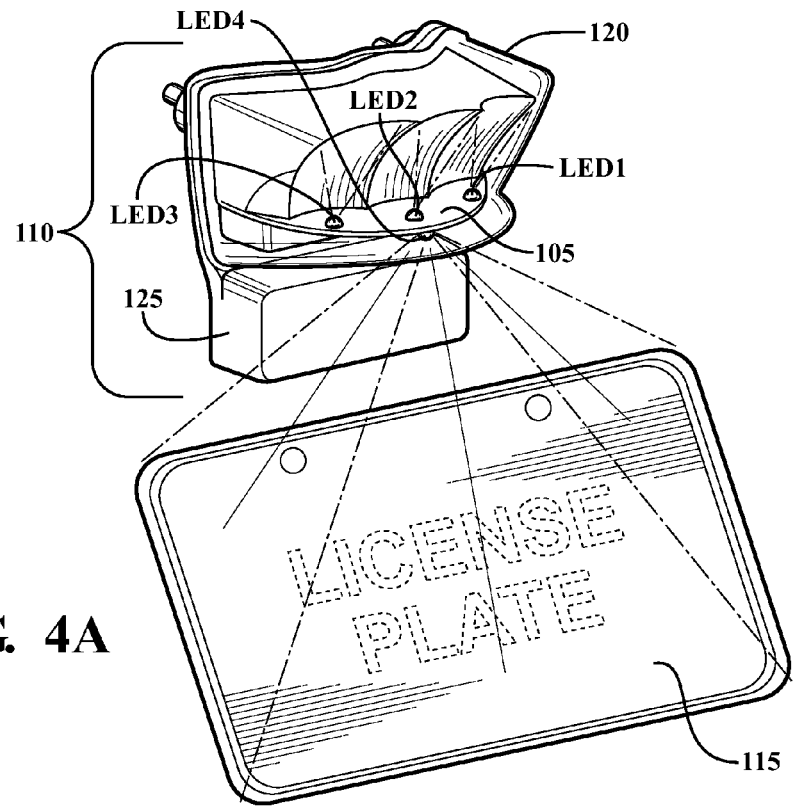
FIGS. 4A-4C illustrate an exemplary light assembly according to the invention.
Figure 4B:
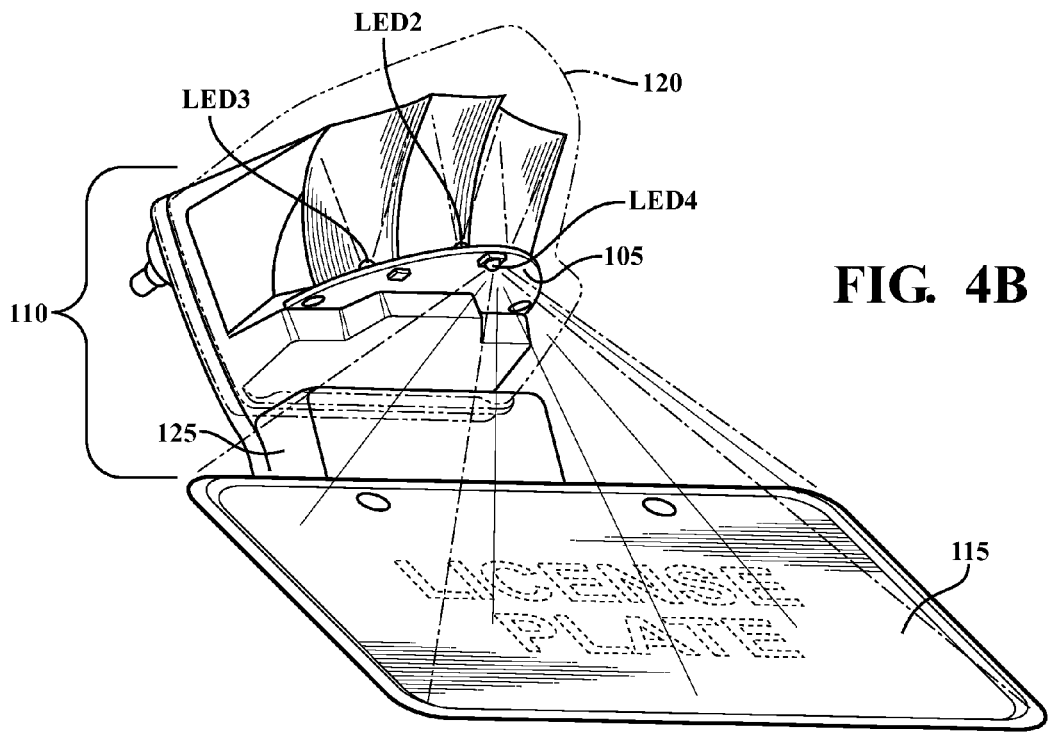
Figure 4C:
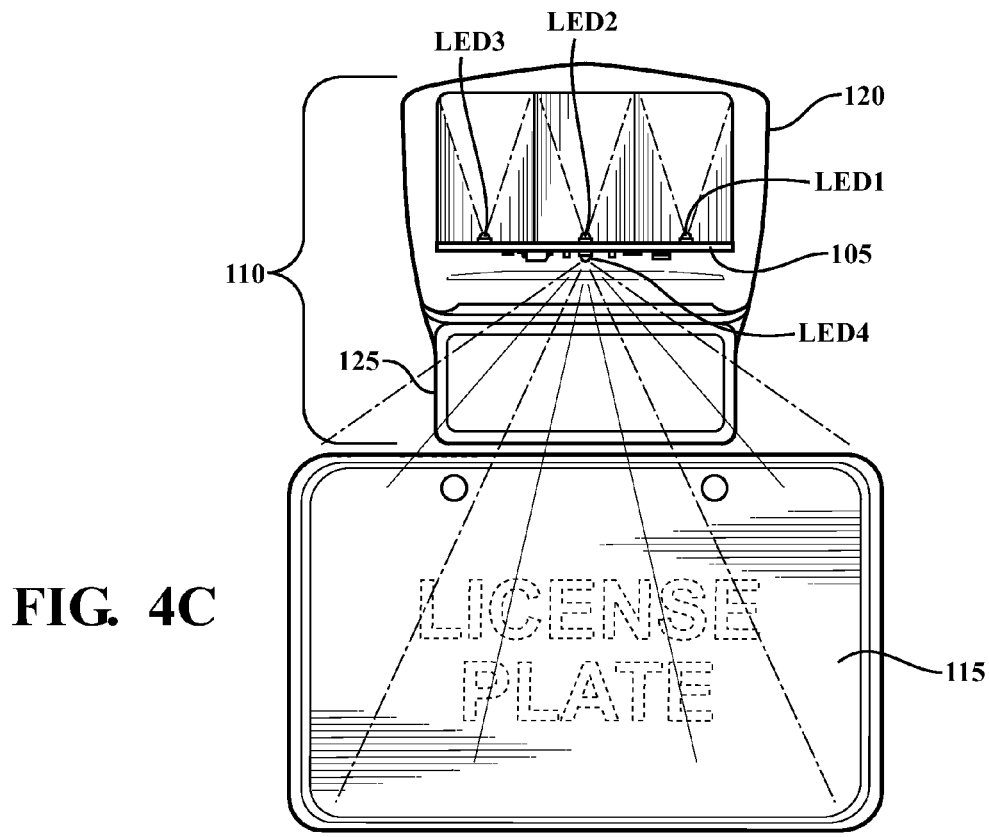

The PCB 105 as depicted, for example, in FIGS. 3A-3E is located or secured in the light assembly, as shown in FIGS. 4A-4E. FIGS. 4A-4C show an isometric view of the light assembly 110, with LEDs 1, 2, 3 of PCB 105 projecting outward to provide a tail light and stop light feature, and LED4 projecting onto a license plate 115 located beneath the light assembly. As illustrated in FIGS. 4A-E, light assembly 110 includes PCB 105, housing 120, and reflector receptor 125. Housing 120 is made of a reflective material to receive and reflect light from LEDs 1, 2 and 3 on the front (top) side of PCB 105. Light from LED4 on the rear (bottom) side of PCB 105 is directed to license plate 115.

Figure 4E:
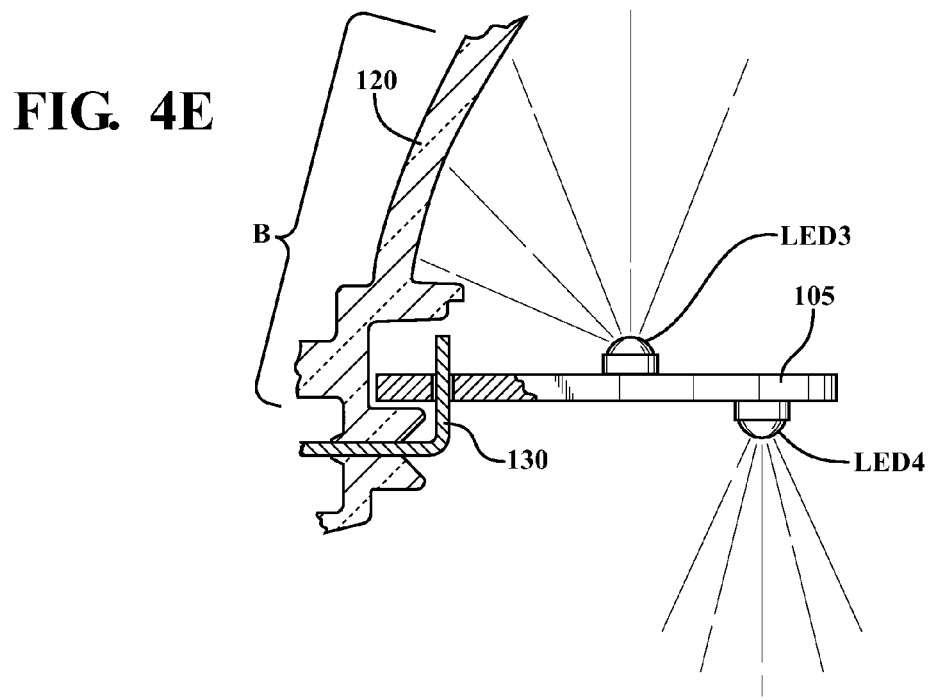
FIG. 4E illustrates an exemplary printed circuit board in the light assembly depicted in FIGS. 4A-4C.
Figure 4D:
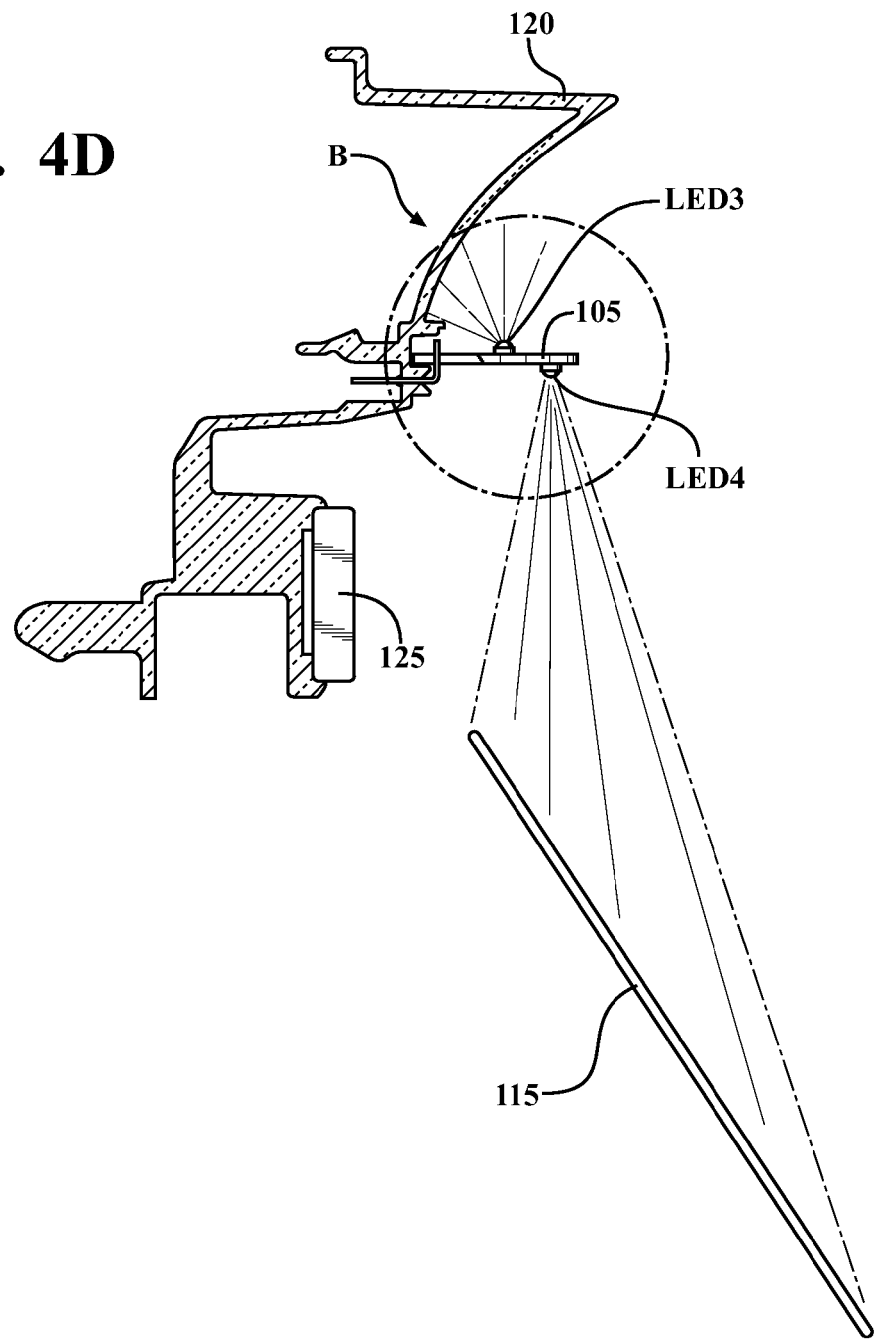
FIG. 4D illustrates a cross-section view of FIG. 4C according to the invention.

FIG. 4D shows a cross section cut A-A of FIG. 4C, whereby the PCB has LEDs 1, 2, 3 and 4, each of which are capable of projecting light onto a respective lens, reflector and/or license plate. As viewed in the illustration, light from at least one of LEDs 1, 2 and 3 reflected onto housing 120 is directed outward in order to provide a tail light and/or stop light feature. LED4, on the other hand, is used to illuminate a license plate. As illustrated, LED4 projects light directing onto the license plate 115 without reflection. FIG. 4E shows an expanded detailed view of B from FIG. 4D. In this embodiment, PCB 105 is secured to receptor 130. It is appreciated, however, that the PCB 105 may be secured or mounted within the light assembly 110 in other manners well known in the art, and is not limited to the illustrated embodiment.

Figure 5:
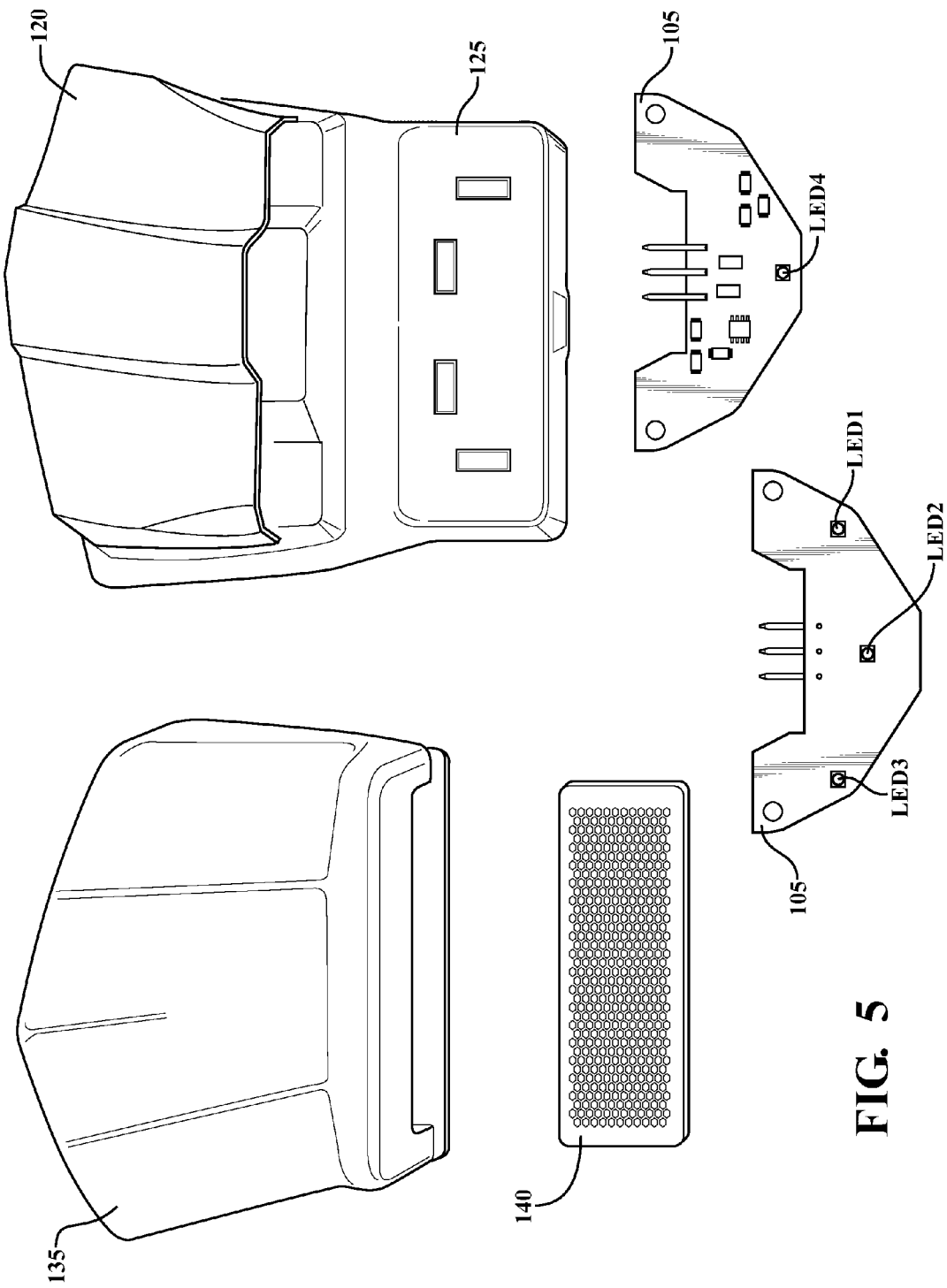
FIG. 5 illustrates an exemplary disassembled embodiment according to the invention.

FIG. 5 shows a disassembled embodiment of the light assembly 110. The light assembly in FIG. 5 shows PCB 105 (top and bottom), housing/reflector 120, reflector receptor 125, lens 135 and reflector 140. After PCB 105 is secured into the light assembly, as previously described, lens 135 is placed on top of housing/reflector 120, and reflector 140 is attached to reflector receptor 125. The PCB 105 includes LEDS 1, 2 and 3 on one side, and a single LED4 on the other side.

Figure 6A:
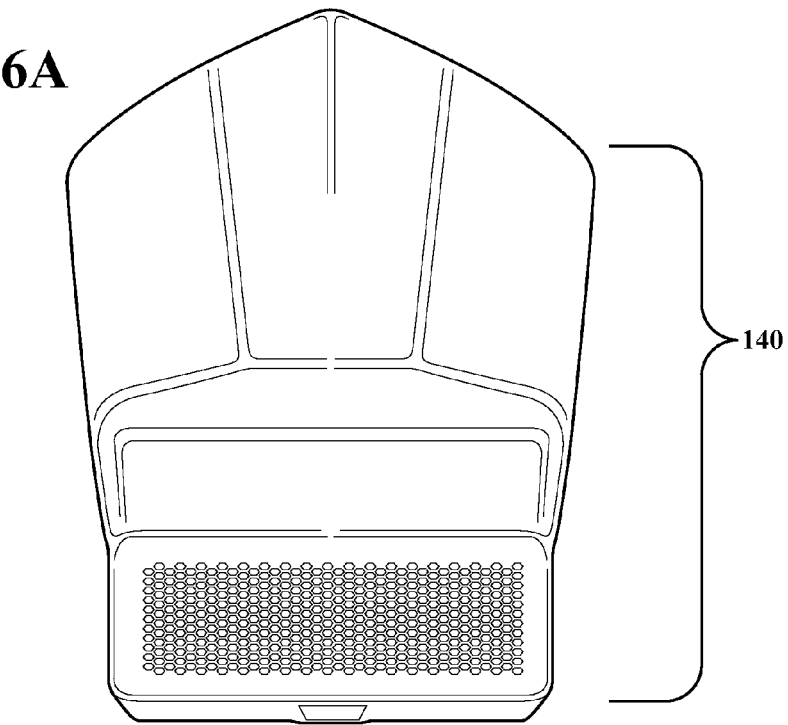
FIG. 6A illustrates an exemplary assembled embodiment according to the invention.
Figure 6B:
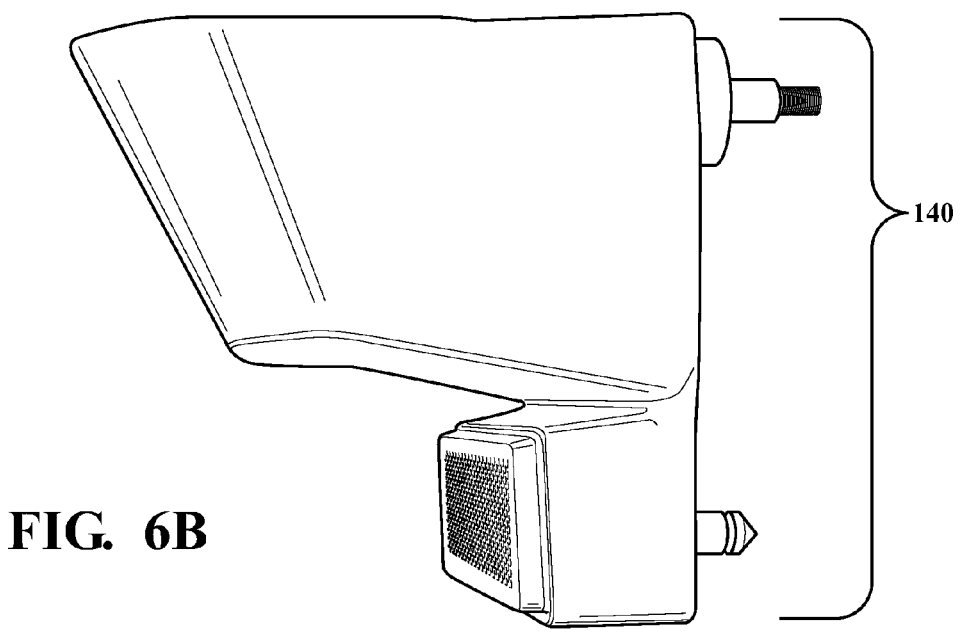
FIG. 6B illustrates another exemplary assembled embodiment according to the invention.

FIG. 6A shows the light assembly 110 in an assembled embodiment from a front view, and FIG. 6B shows the light assembly in an assembled embodiment from a side view. In the illustrated embodiments, the assembled light assembly 110 is a tail light for a motorcycle. However, it is understood that these illustrations are exemplary embodiments of the invention and are not limited to a tail light assembly of a motorcycle. The PCB and LEDs may be arrange in any shape or form to create various light assemblies for use in vehicles. For example, the light assembly may be in the form of flashers, side lights, signal lights, etc. It is appreciated that use of a single PCB with at least one light on each side of the PCB provides a device and method by which multiple functions can be performed without the complexity of multiple PCBs.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A light assembly for a vehicle, comprising:
   a single printed circuit board having a first side and a second side;
   at least one light disposed on the first side of the printed circuit board for performing a first lighting function and at least one light disposed on the second side of the printed circuit board for performing a second lighting function different than said first lighting function;
   a housing to reflect light from said at least one light on said first side of said printed circuit board;
   a lens covering said housing to diffuse and direct light outwardly;
   a reflector receptor located beneath said lens; and
   a reflector secured to said reflector receptor to reflect light.

2. The light assembly of claim 1, wherein said at least one light on said second side of said printed circuit board illuminates a license plate of the vehicle.

3. The light assembly of claim 1, wherein said single printed circuit board includes a first, a second and a third light on said first side, and includes a fourth light on said second side.

4. The light assembly of claim 3, wherein said first, second and third lights are configured to direct light onto said housing and said housing reflects the light outwardly, and said fourth light is configured to direct light directly onto a license plate of the vehicle.

5. The light assembly of claim 4, wherein said lights are LEDs.

6. The light assembly of claim 5, wherein said LEDs illuminate a red or white color.

7. The light assembly of claim 1, wherein said first side of said printed circuit board further includes a plurality of LEDs electrically connected in series with one another and electrically coupled to a power source on said first side of said printed circuit board, and wherein said second side of said printed circuit board includes a single LED.

8. The light assembly of claim 7, wherein said plurality of LEDs on said first side of said printed circuit board are stop and tail lights, and wherein said single LED on said second side of said printed circuit board is a license plate light.

9. A printed circuit board for use in a light assembly of a vehicle, comprising:
   a first side having at least one light for performing a first lighting function;
   a second side having at least one light for performing a second lighting function different than said first lighting function;
   said first side of said printed circuit board including a plurality of LEDs electrically connected in series with one another and electrically coupled to a power source;
   said second side of said printed circuit board including a single LED electrically coupled to said power source; and
   wherein said plurality of LEDs on said first side of said printed circuit board are stop and tail lights and said single LED on said second side of said printed circuit board is a license plate light.

10. A printed circuit board for use in a light assembly of a vehicle, comprising:
    a first side having at least one light for performing a first lighting function;
    a second side having at least one light for performing a second lighting function different than said first lighting function; and
    wherein said printed circuit board is mounted inside of said light assembly, and said light assembly includes a housing to reflect light from said at least one light on said first side of said printed circuit board, a lens covering said housing to diffuse and direct light outwardly, a reflector receptor located beneath said lens, and a reflector secured to said reflector receptor to reflect light.

11. The light assembly of claim 10, wherein said at least one light on said first side of said printed circuit board is a stop and tail light, and wherein said at least one light on said second side of said printed circuit board is a license plate light.

* * * * *